United States Patent
Qian et al.

(10) Patent No.: US 10,518,507 B2
(45) Date of Patent: Dec. 31, 2019

(54) VEHICLE AND BUILDING USING A WINDOW FILM HAVING CARBON NANOTUBES

(71) Applicant: Beijing FUNATE Innovation Technology Co., LTD., Beijing (CN)

(72) Inventors: Li Qian, Beijing (CN); Liang Liu, Beijing (CN); Chen Feng, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 0 days.

(21) Appl. No.: 16/186,414

(22) Filed: Nov. 9, 2018

(65) Prior Publication Data

US 2019/0091975 A1  Mar. 28, 2019

Related U.S. Application Data

(63) Continuation of application No. 14/302,252, filed on Jun. 11, 2014, now abandoned, which is a continuation of application No. 12/855,851, filed on Aug. 13, 2010, now abandoned.

(30) Foreign Application Priority Data

Dec. 29, 2009  (CN) .......................... 2009 1 0265339

(51) Int. Cl.
| | |
|---|---|
| *B32B 27/06* | (2006.01) |
| *G02B 1/14* | (2015.01) |
| *B32B 27/04* | (2006.01) |
| *B32B 27/08* | (2006.01) |
| *B82Y 20/00* | (2011.01) |
| *B82Y 30/00* | (2011.01) |
| *G02B 1/10* | (2015.01) |
| *B32B 5/04* | (2006.01) |
| *B32B 9/00* | (2006.01) |

(52) U.S. Cl.
CPC ................ *B32B 27/06* (2013.01); *B32B 5/04* (2013.01); *B32B 9/007* (2013.01); *B32B 27/04* (2013.01); *B32B 27/08* (2013.01); *B82Y 20/00* (2013.01); *B82Y 30/00* (2013.01); *G02B 1/105* (2013.01); *G02B 1/14* (2015.01); *B32B 2255/205* (2013.01); *B32B 2260/021* (2013.01); *B32B 2605/006* (2013.01); *Y10T 428/249945* (2015.04); *Y10T 428/30* (2015.01)

(58) Field of Classification Search
CPC .... Y10T 428/30; B82Y 30/00; Y10S 977/742
USPC .......................................... 428/408; 423/448
See application file for complete search history.

(56) References Cited

U.S. PATENT DOCUMENTS

| | | | |
|---|---|---|---|
| 7,045,108 B2 * | 5/2006 | Jiang ........................ | B01J 23/74 423/447.1 |
| 2003/0122111 A1 * | 7/2003 | Glatkowski ............ | B82Y 10/00 252/500 |
| 2009/0237886 A1 * | 9/2009 | Iwai ....................... | H01L 23/373 361/708 |

(Continued)

*Primary Examiner* — Daniel H Miller
(74) *Attorney, Agent, or Firm* — ScienBiziP, P.C.

(57) ABSTRACT

A vehicle and a building includes a window and a window film attached on the window. The window film includes a polymer film, a carbon nanotube film embedded in the polymer film, and a protective layer located on the polymer film. The carbon nanotube film includes a plurality of carbon nanotubes substantially aligned along the same direction. The carbon nanotube film is located between the protective layer and the polymer film.

18 Claims, 10 Drawing Sheets

(56) References Cited

U.S. PATENT DOCUMENTS

2009/0267000 A1\* 10/2009 Chen ................ H01B 1/04
250/492.1
2011/0132449 A1   6/2011 Ramadas et al.

\* cited by examiner

VEHICLE AND BUILDING USING A WINDOW FILM HAVING CARBON NANOTUBES

FIELD

The present disclosure relates to window films and vehicles using the same, particularly, to a window film based on carbon nanotubes and a vehicle using the same.

BACKGROUND

There are many types of window films available in the market for a wide variety of uses including solar heat reduction, UV protection, privacy, safety and security, decorative applications, and heat retention. Window films are normally applied to the windows of buildings or vehicles to reduce the amount of infrared, visible light, and ultraviolet (UV) radiation entering windows. Window films used on vehicles also prevent windows of the vehicles from shattering, these films are intended to maintain the integrity of glass when subject to heavy impact.

For security and reducing UV radiation, the window film includes a heavy-gauge plastic sheet and a low-emission coating layer. A low emission coating layer is formed on the surface of the heavy-gauge plastic sheet using a very complicated method. However, the strength of the heavy-gauge plastic sheet is insufficient to prevent fragmentation and the production of hazardous glass shards from concussion forces.

What is needed, therefore, is to provide a window film that provides good protection for windows of vehicles, and a vehicle and a building using the same.

BRIEF DESCRIPTION OF THE DRAWINGS

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
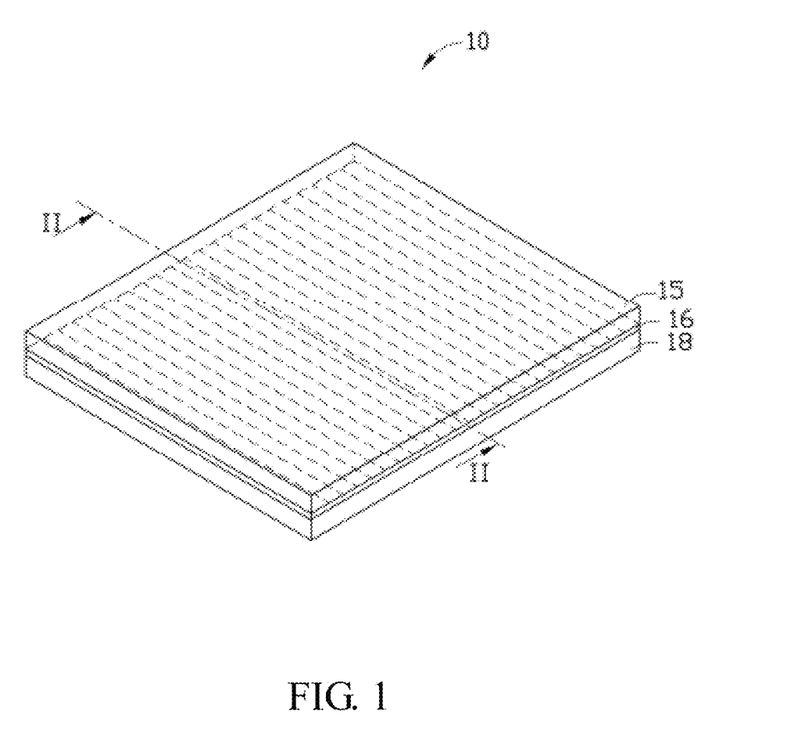
FIG. 1 is a schematic view of an embodiment of a window film.
Figure 2:
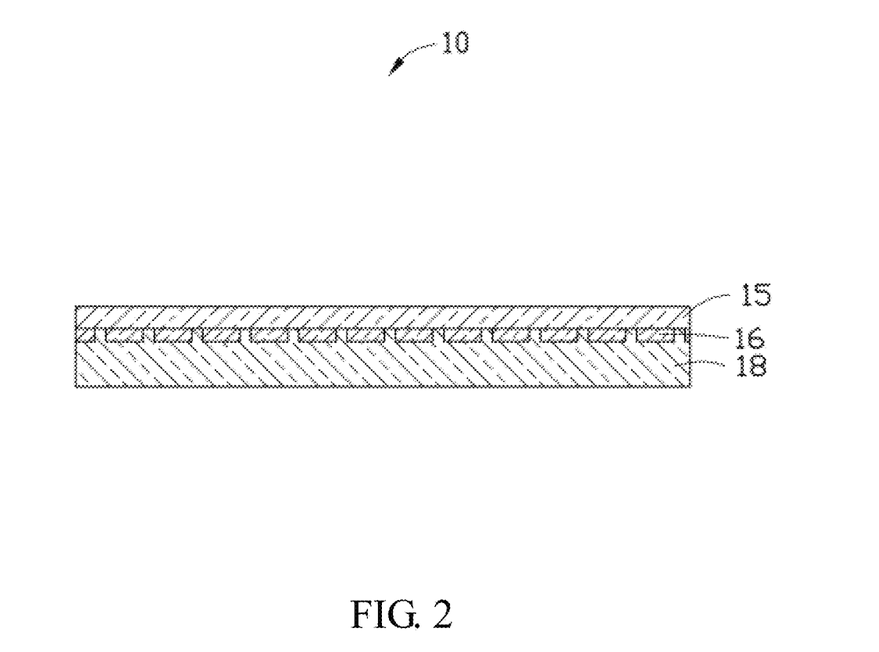
FIG. 2 is a cross-sectional view taken along a line II-II of the window film shown in FIG. 1.

Referring to FIG. 1 and FIG. 2, one embodiment of a window film 10 includes a polymer film 18, a protective layer 15, and at least one carbon nanotube film 16 embedded in the polymer film 18 and located between the protective layer 15 and the polymer film 18. The protective layer 15 is disposed on a top surface of the polymer film 18 and covers the at least one carbon nanotube film 16.

The polymer film 18 can have a curved structure or a planar structure and functions as a support with suitable transparency. The polymer film 18 can be made of a flexible polymer material, such as polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins. The shape and size of the polymer film 18 is not limited, and can be determined according to need. For example, the polymer film 18 may be square, round or triangular. In one embodiment, the polymer film 18 is a square sheet with a thickness about 0.5 millimeters, which is made of PET.

Figure 3:
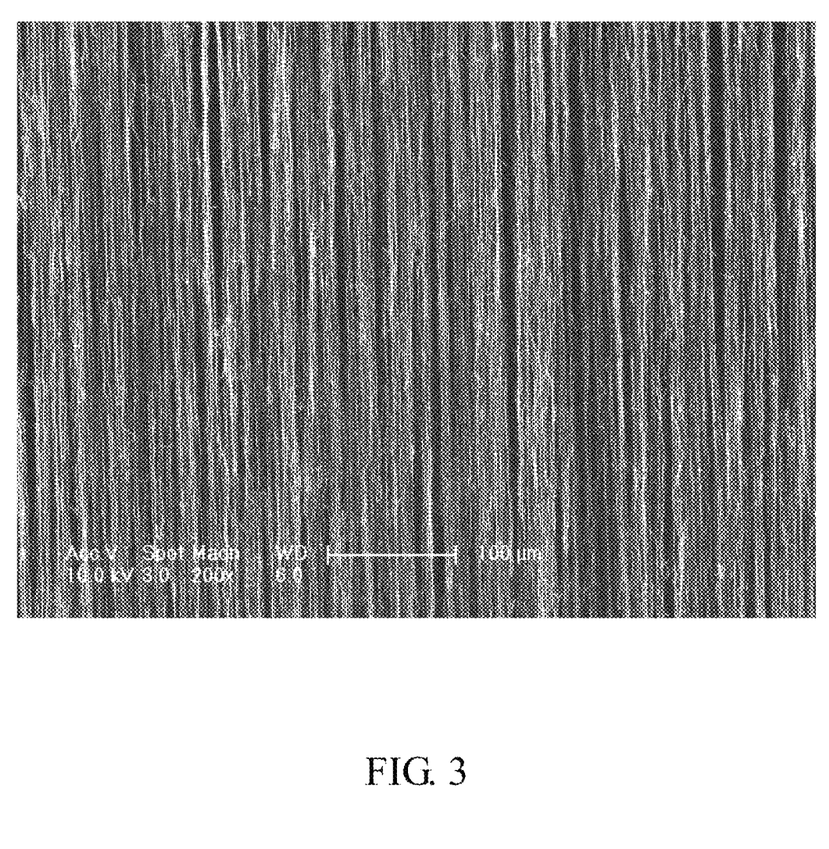
FIG. 3 is a Scanning Electron Microscope (SEM) image of a carbon nanotube film used in a window film of one embodiment.

Referring to FIG. 3, the carbon nanotube film 16 can be a free-standing structure, meaning that the carbon nanotube film 16 can be supported by itself without a substrate for support. For example, if a point of the carbon nanotube film 16 is held, the entire carbon nanotube film 16 can be supported from that point without damage. Examples of the carbon nanotube film 16 are taught by U.S. Pat. No. 7,045,108 to Jiang et al. The carbon nanotube film 16 includes a number of successive carbon nanotubes joined end to end by Van der Waals attractive force therebetween, and substantially oriented along a same direction. The carbon nanotube film 16 can be a substantially pure structure consisting of the carbon nanotubes with few impurities and transparent. The carbon nanotube film 16 can be fixed on the polymer film 18 firmly because the carbon nanotubes of the carbon nanotube film 16 combined end to end by Van der Waals attractive force, have good adhesion. The thickness of the carbon nanotube film 16 can be in a range from about 0.5 nanometers to about 100 micrometers.

Figure 4:
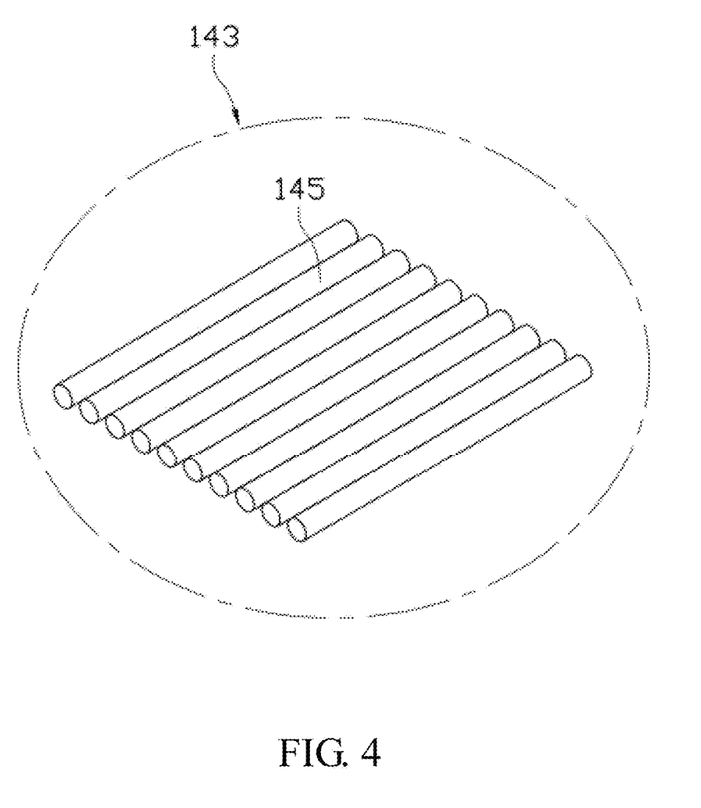
FIG. 4 is a schematic view of a carbon nanotube segment in the carbon nanotube film of FIG. 3.

Referring to FIG. 3 and FIG. 4, the carbon nanotube film 16 includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and combined by Van der Waals attractive force therebetween. The carbon nanotubes in the carbon nanotube film 16 can be single-walled, double-walled, and/or multi-walled carbon nanotubes.

Additionally, the carbon nanotube film 16 includes a number of interspaces between the carbon nanotubes of the carbon nanotube film 16 that have good light transmittance. The light transmittance of the carbon nanotube film 16 can be in a range from about 60% to about 95%. The polymer film 18 fills the interspaces of the carbon nanotube film 16, which makes the carbon nanotube film 16 and the polymer film 18 form a whole structure, meaning that the carbon nanotubes of the carbon nanotube film 16 are connected to each other and form a free-standing structure. The window film 10 has good strength because the carbon nanotubes of the carbon nanotube film 16 have strong material properties. Because the carbon nanotubes of the carbon nanotube film 16 have good UV light absorption, the window film 10 will also have good UV light absorption. The window film 16 can protect the passenger in the vehicle from the harmful UV light.

The strength of the window film 10 increases with an increasing number of layers of carbon nanotube films 16. Additionally, if the carbon nanotubes in the carbon nanotube films 16 are aligned along one preferred orientation, an angle can exist between the orientations of the carbon nanotubes in adjacent carbon nanotube films 16. Adjacent carbon nanotube films 16 can be combined by the Van der Waals attractive force therebetween. An angle between the aligned directions of the carbon nanotubes in two adjacent carbon nanotube films 16 can range from about 0 degrees to about 90 degrees.

A method for combining the at least one carbon nanotube film 16 with the polymer film 18 includes:
(a) providing a layer of the polymer film 18;
(b) providing at least one carbon nanotube film 16;
(c) disposing the at least one carbon nanotube film 16 on a surface of the layer of the polymer film 18 to form a preform; and
(d) hot pressing the preform to combine the at least one carbon nanotube film 16 with the layer of the polymer film 18.

Figure 5:
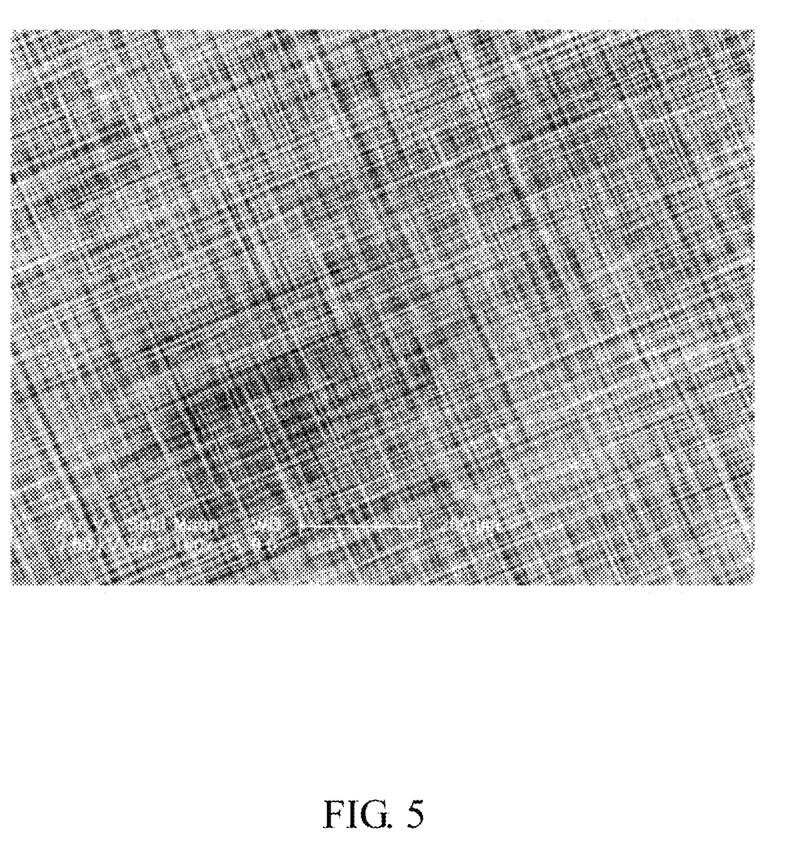
FIG. 5 is an SEM image of at least two stacked carbon nanotube films used in a window film of one embodiment.

Referring to FIG. 5, one embodiment of a window film 10 includes 4 layers of carbon nanotube films 16 stacked one on top of another, with an angle between the aligned directions of the carbon nanotubes in two adjacent carbon nanotube films 16 being about 90 degrees. There are a number of micropores between the carbon nanotubes of the crossed carbon nanotube films 16. The polymer material of the polymer film 18 can fill in the micropores to ensure the carbon nanotube films 16 is combined tightly with the polymer film 18.

Referring to FIG. 2, the protective layer 15 covers and protects the at least one carbon nanotube film 16. The protective layer 15 is made of a transparent polymer, such as polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, acrylic resins, or epoxy resin. The thickness of the protective layer 15 is not limited, and can be selected according to the application. In one embodiment, the protective layer 15 is made of epoxy resin, with a thickness about 200 micrometers.

Figure 6:
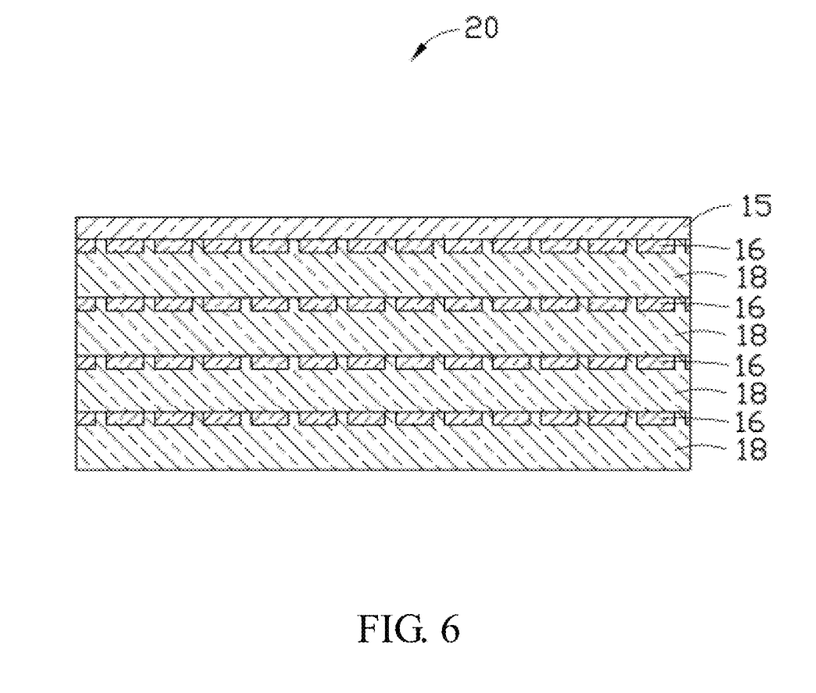
FIG. 6 is a schematic view of another embodiment of a window film.

Referring to FIG. 6, one embodiment of a window film 20 includes a polymer film 18, a plurality of carbon nanotube films 16, and a protective layer 15. The carbon nanotube films 16 are spaced apart from each other and are disposed in the polymer film 18. The protective layer 15 is disposed on a surface of the polymer film 18. The carbon nanotube films 16 are located between the protective layer 15 and the polymer film 18.

In the polymer film 18, the carbon nanotube films 16 are spaced apart from each other and alternatively positioned in the polymer film 18 between upper and lower layer portions of the polymer film 18, with the carbon nanotubes uniformly disposed in the polymer film 18. A number of interspaces defined between the carbon nanotubes, are filled in by the material of the polymer film 18 fills. That is, the carbon nanotube films 16 are soaked with and combined with the polymer film 18. The carbon nanotube films 16 are spaced apart from each other in the polymer film 18 so that the strength of the window film 20 is improved.

Figure 7:
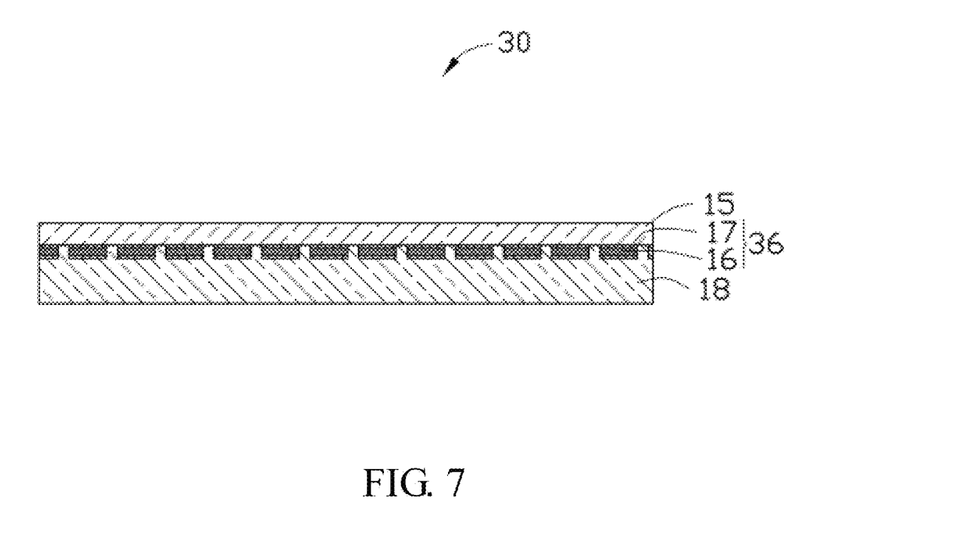
FIG. 7 is a schematic view of one embodiment of a window film including a composite carbon nanotube film.

Referring to FIG. 7, another embodiment of a window film 30 includes a polymer film 18, a composite carbon nanotube film 36, and a protective layer 15. The composite carbon nanotube film 36 is made of at least one carbon nanotube film 16 and a metal layer 17. The metal layer 17 is coated on outer surface of the carbon nanotubes of the at least one carbon nanotube film 16. The metal layer 17 can be formed on the outer surface of the carbon nanotubes of the at least one carbon nanotube film 16 by a physical vapor deposition (PVD) method such as vacuum evaporation or sputtering. The material of the metal layer 17 can be gold (Au), silver (Ag), copper (Cu), nickel (Ni), palladium (Pd), or titanium (Ti). In one embodiment, the material of the metal layer 17 is Au, with a thickness of about 10 nanometers.

Figure 8:
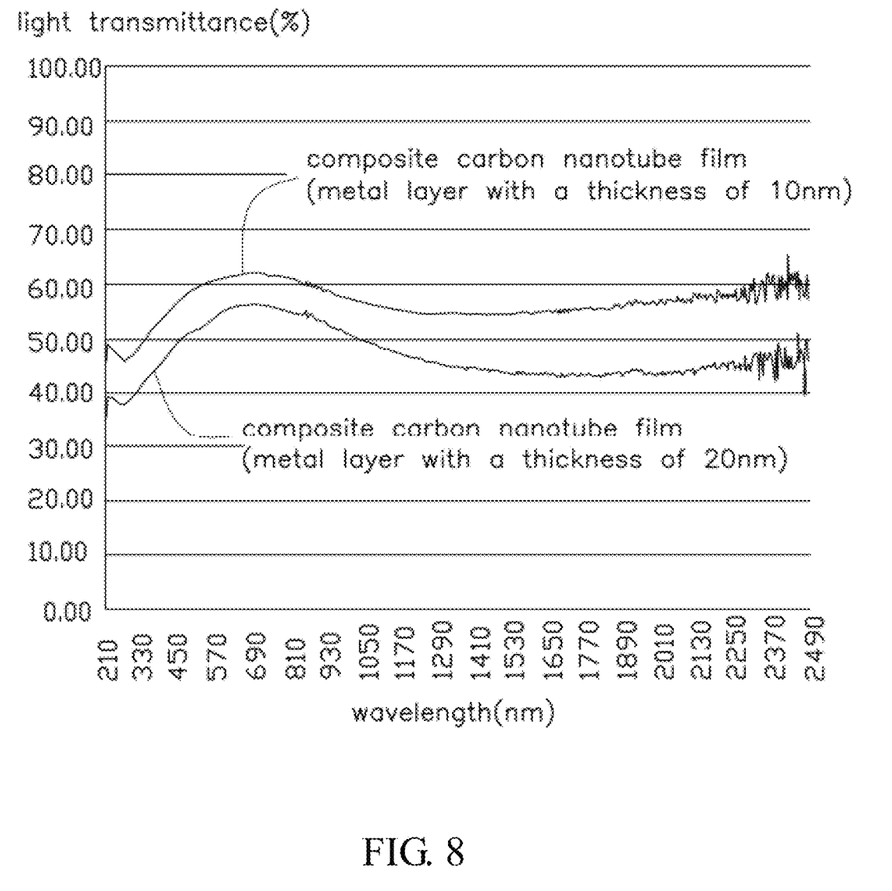
FIG. 8 shows a relation between the light transmittance of the composite carbon nanotube film and the wavelength of light.

Referring to FIG. 8, the composite carbon nanotube film 36 of the window film 30 has low light transmittance of infrared light at a wavelength greater than 800 nanometers. The composite carbon nanotube film 36 has good light transmittance in the visible region at a wavelength ranging from about 400 nanometers to about 800 nanometers. The composite carbon nanotube film 36 has a low transmittance in the ultraviolet region at a wavelength less than 400 nanometers. Therefore, the carbon nanotube film 36 has a good absorption of ultraviolet light and a good reflection of infrared light. The window film 30 can reflect the infrared light to prevent the infrared light from entering through the windows. As shown in FIG. 8, the composite carbon nanotube film 36 has a maximum transmittance at a first wavelength range of visible light the maximum transmittance is about 63% when the thickness of the metal layer 17 is about 10 nanometers, and the maximum transmittance is about 56% when the thickness of the metal layer 17 is about 20 nanometers; the transmittance of infrared light at a second wavelength range from about 800 nanometers to about 2250 nanometers is less than the transmittance of red light and the transmittance of ultraviolet light at a third wavelength range from about 210 nanometers to about 380 nanometers is less than the transmittance of violet light.

Figure 9:
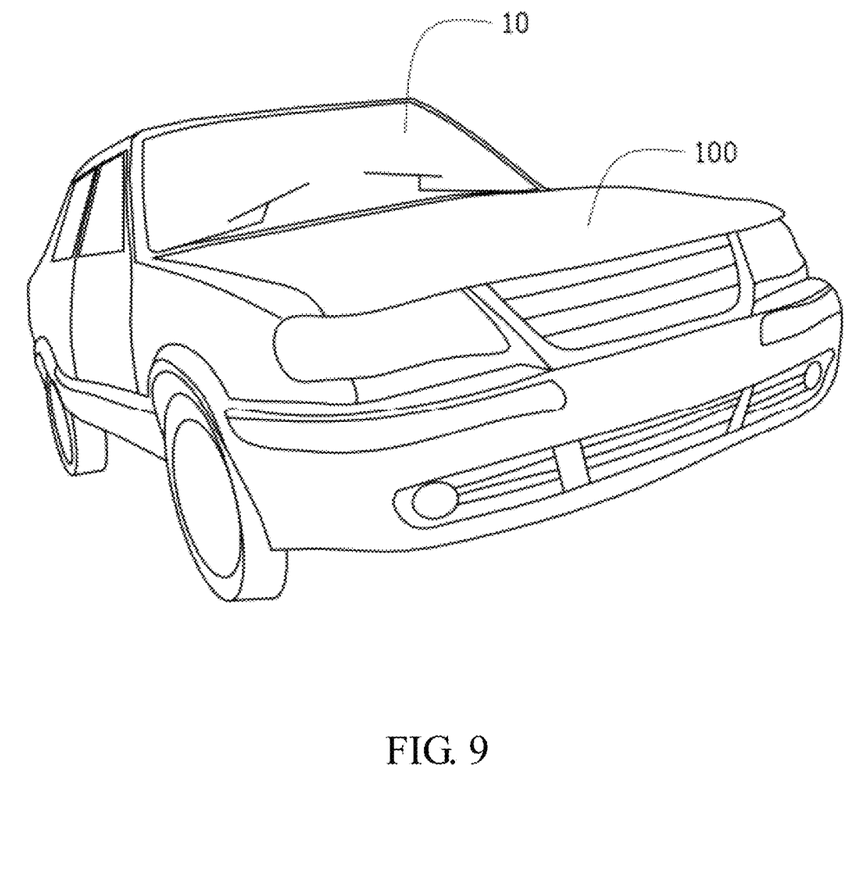
FIG. 9 is a schematic view of one embodiment of a vehicle with a window film of one embodiment.

Referring to FIG. 9, one embodiment of a vehicle 100 with a window film 10 is provided. The window film 10 is attached on the outside surface of the front window of the vehicle 100. A surface of the window film 10 having the carbon nanotube film 16 thereon faces the outside of the vehicle 100. The window film 10 can also be used on the rear or the side windows of the vehicle 100.

The application of the window films 10, 20, and 30 are not limited in the field of vehicles; it is can also to be used in the field of building windows.

Figure 10:
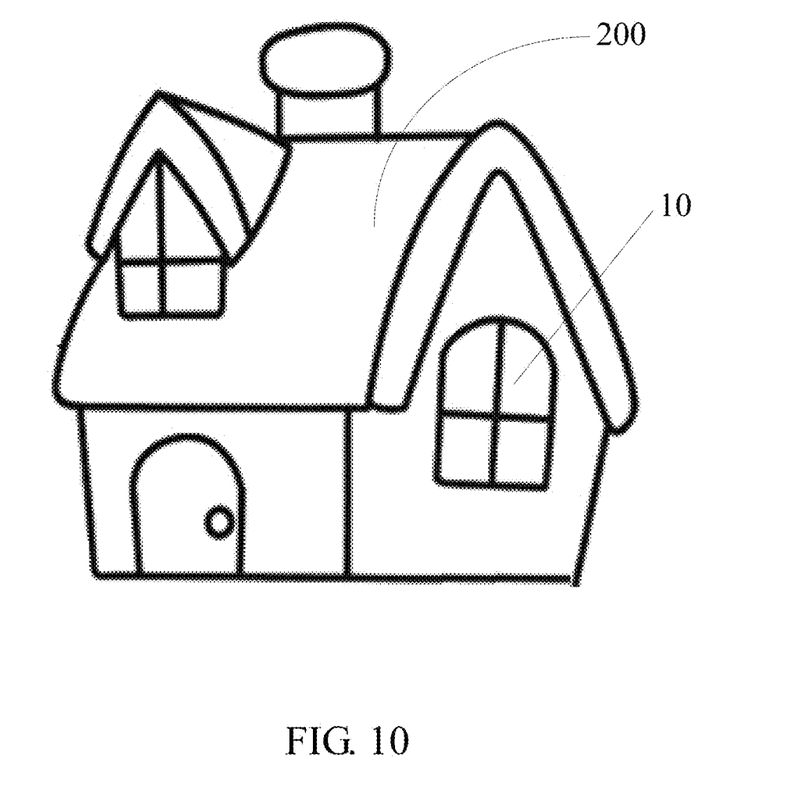
FIG. 10 is a schematic view of one embodiment of a building with a window film of one embodiment.

Referring to FIG. 10, one embodiment of a building 200 with a window film 10 is provided. The window film 10 is attached on the outside surface of the window of the building 200.

It is to be understood that the above-described embodiments are intended to illustrate rather than limit the present disclosure. Any elements described in accordance with any embodiments is understood that they can be used in addition or substituted in other embodiments. Embodiments can also be used together. Variations may be made to the embodiments without departing from the spirit of the present disclosure. The above-described embodiments illustrate the scope, but do not restrict the scope of the present disclosure.

What is claimed is:
1. A vehicle, comprising a window, and a window film attached on the window, wherein the window film comprises:
a polymer film;
a composite carbon nanotube film embedded in the polymer film, wherein the composite carbon nanotube film comprises:

a carbon nanotube film comprising a plurality of carbon nanotubes substantially aligned along the same direction and parallel to the polymer film; and a metal layer coated on outer surface of the plurality of carbon nanotubes and the metal layer has a thickness in a range from approximately 10 nanometers to approximately 20 nanometers; and a protective layer located on the polymer film, wherein the composite carbon nanotube film is located between the protective layer and the polymer film, wherein the composite carbon nanotube film has a maximum transmittance at a first wavelength range of visible light the maximum transmittance is approximately 63% when the thickness of the metal layer is approximately 10 nanometers, and the maximum transmittance is approximately 56% when the thickness of the metal layer is approximately 20 nanometers; the transmittance of infrared light at a second wavelength ranging from approximately 800 nanometers to approximately 2250 nanometers is less than the transmittance of red light; and the transmittance of ultraviolet light at a third wavelength ranging from approximately 210 nanometers to approximately 380 nanometers is less than the transmittance of violet light.

2. The vehicle of claim 1, wherein the carbon nanotube film is a free-standing structure, and the plurality of carbon nanotubes are joined end-to-end by Van der Waals attractive force therebetween.

3. The vehicle of claim 1, wherein the window film comprises a plurality of composite carbon nanotube films spaced apart from each other.

4. The vehicle of claim 1, wherein the metal layer comprises a first metal film located on a first surface of the carbon nanotube film.

5. The vehicle of claim 4, wherein the comprises a second metal film located on a second surface of the carbon nanotube film, and the second surface is opposite to the first surface.

6. The vehicle of claim 1, wherein the metal layer comprises a material selected from the group consisting of gold, silver, copper, nickel, palladium, and titanium.

7. The vehicle of claim 1, wherein the carbon nanotube film defines a plurality of interspaces between the plurality of carbon nanotubes, and the polymer film fills in the plurality of interspaces.

8. The vehicle of claim 1, wherein the polymer film comprises a first material selected from the group consisting of polycarbonate, polymethyl methacrylate acrylic, polyethylene terephthalate, polyether polysulfones, polyvinyl polychloride, benzocyclobutenes, polyesters, and acrylic resins; and the protective layer comprises a second material selected from the group consisting of polycarbonate, polymethyl methacrylate acrylic, polyethylene terephthalate, polyether polysulfones, polyvinyl polychloride, benzocyclobutenes, polyesters, acrylic resins, or epoxy resin.

9. The vehicle of claim 1, wherein the metal layer is a gold film.

10. A building, comprising a window, and a window film attached on the window, wherein the window film comprises:

a polymer film;

a composite carbon nanotube film embedded in the polymer film, wherein the composite carbon nanotube film comprises:

a carbon nanotube film comprising a plurality of carbon nanotubes substantially aligned along the same direction and parallel to the polymer film; and a metal layer coated on outer surface of the plurality of carbon nanotubes and the metal layer has a thickness in a range from approximately 10 nanometers to approximately 20 nanometers; and a protective layer located on the polymer film, wherein the composite carbon nanotube film is located between the protective layer and the polymer film, wherein the composite carbon nanotube film has a maximum transmittance at a first wavelength range of visible light the maximum transmittance is approximately 63% when the thickness of the metal layer is approximately 10 nanometers, and the maximum transmittance is approximately 56% when the thickness of the metal layer is approximately 20 nanometers; the transmittance of infrared light at a second wavelength ranging from approximately 800 nanometers to approximately 2250 nanometers is less than the transmittance of red light and the transmittance of ultraviolet light at a third wavelength ranging from approximately 210 nanometers to approximately 380 nanometers is less than the transmittance of violet light.

11. The building of claim 10, wherein the carbon nanotube film is a free-standing structure, and the plurality of carbon nanotubes are joined end-to-end by Van der Waals attractive force therebetween.

12. The building of claim 10, wherein the window film comprises a plurality of composite carbon nanotube films spaced apart from each other.

13. The building of claim 10, wherein the metal layer comprises a first metal film located on a first surface of the carbon nanotube film.

14. The building of claim 13, wherein the metal layer comprises a second metal film located on a second surface of the carbon nanotube film, and the second surface is opposite to the first surface.

15. The building of claim 10, wherein the metal layer comprises a material selected from the group consisting of gold, silver, copper, nickel, palladium, and titanium.

16. The building of claim 10, wherein the carbon nanotube film defines a plurality of interspaces between the plurality of carbon nanotubes, and the polymer film fills in the plurality of interspaces.

17. The building of claim 10, wherein the polymer film comprises a first material selected from the group consisting of polycarbonate, polymethyl methacrylate acrylic, polyethylene terephthalate, polyether polysulfones, polyvinyl polychloride, benzocyclobutenes, polyesters, and acrylic resins; and the protective layer comprises a second material selected from the group consisting of polycarbonate, polymethyl methacrylate acrylic, polyethylene terephthalate, polyether polysulfones, polyvinyl polychloride, benzocyclobutenes, polyesters, acrylic resins, or epoxy resin.

18. The building of claim 10, wherein the metal layer is a gold film.

* * * * *